Nov. 4, 1924.

F. C. ATWOOD

CANNULA

Filed Jan. 12, 1921

1,513,953

Francis Clarke Atwood
INVENTOR.

BY
Roberts, Roberts & Cushman
ATTORNEYS

Patented Nov. 4, 1924.

1,513,953

UNITED STATES PATENT OFFICE.

FRANCIS CLARKE ATWOOD, OF NEWTON, MASSACHUSETTS, ASSIGNOR, BY MESNE ASSIGNMENTS, TO AMERICAN PROTEIN CORPORATION, OF BOSTON, MASSACHUSETTS, A CORPORATION OF MASSACHUSETTS.

CANNULA.

Application filed January 12, 1921. Serial No. 436,644.

*To all whom it may concern:*

Be it known that I, FRANCIS CLARKE ATWOOD, a citizen of the United States of America, and resident of Newton, in the county of Middlesex and State of Massachusetts, have invented new and useful Improvements in Cannulas, of which the following is a specification.

This invention relates to a cannula especially designed for collecting blood from food animals at the time of slaughter in condition suitable for human food or for therapeutic purposes. An essential condition for accomplishing this, assuming the health of the animal, is that the blood be drawn from the interior of the body of the animal without coming in contact with the exterior of the animal or with any other contaminating influence. The principal object of the present invention is to provide a novel and improved form of cannula which may be readily inserted in a previously made incision in the body of the animal without carrying in contaminating matter with it, which will permit the blood to flow freely therethrough from the interior of the body, and which may be firmly retained in the incision while the blood is flowing.

Figure 1:
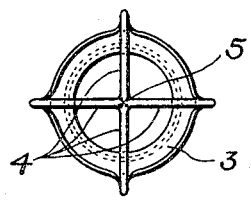
Figure 2:
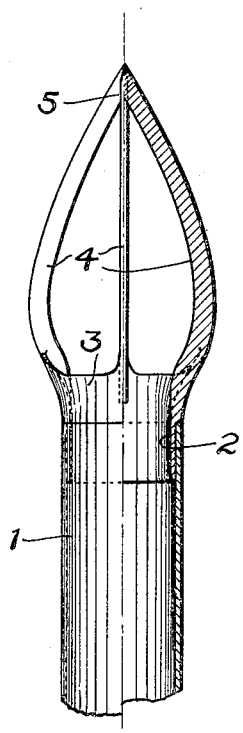

In the accompanying drawings which illustrate a preferred embodiment of the invention, Figure 1 is a plan view of the forward end of the instrument; and Figure 2 is a side elevation, partly in longitudinal central section;

The cannula comprises the tubular body 1, which may be of any convenient length, and is designed to be connected at its lower or rear end with a suitable tube or pipe (not shown) running to a container. At the forward end of the tube 1 is a head of openwork construction which has a tapered or converging forward end and a rearward part presenting salient or projecting portions extending laterally beyond the periphery of the tubular body.

As herein shown the head consists of an annular base 2 fixed to the forward end of the tubular body 1. The base 2 flares outwardly as shown at 3, and has a plurality of ribs 4 bowed outwardly beyond the periphery of the tubular body, and thence curving inwardly to form a forwardly converging, tapering and pointed end 5. The openwork construction thus formed is adapted easily to slip into a previously formed cut or incision by reason of its tapered form, and to spread the lips of the cut apart by reason of its outwardly bowed or projecting portions, thus facilitating the entrance of the end of the tubular body 1 and preventing it from catching on the lips of the incision and carrying contaminating matter into the cut.

When the end of the tubular body and the head are inserted in the cut the openwork construction of the head permits the blood to flow freely therethrough into the tube. The lips of the cut tend to close around the end of the tube and the enlarged or laterally projecting parts of the head aid in holding the instrument in place. If desired a clamping or gripping device of the character forming the subject matter of another application filed concurrently herewith may be used to clamp the lips of the cut around the end of the tube below the projecting portions of the head, thus firmly securing the instrument in the incision and tightly closing the lips of the cut around the tube while the blood is being drained off.

I claim:

1. A cannula having a hollow body to provide a conduit surmounted by a head of openwork construction consisting of a plurality of circumferentially spaced ribs bowed outwardly beyond the hollow body and terminating at the upper portion of the head in a tapering pointed end.

2. A cannula having a hollow body to provide a substantially unobstructed conduit, a skeleton openwork head surmounting the body and comprising a plurality of ribs diverging outwardly from the upper portion of the body and thence converging to a tapered upper end.

Signed by me at Boston, Massachusetts, this seventh day of January, 1921.

FRANCIS CLARKE ATWOOD.